(12) United States Patent
Ge et al.

(10) Patent No.: US 12,339,528 B2
(45) Date of Patent: Jun. 24, 2025

(54) COLORED COSMETIC PHOTOCHROMIC CONTACT LENSES

(71) Applicant: Alcon Inc., Fribourg (CH)

(72) Inventors: Junhao Ge, Shanghai (CN); Richard Charles Breitkopf, Dunwoody, GA (US); Steve Yun Zhang, Sugar Hill, GA (US); Yuan Chang, Atlanta, GA (US); Augustine Twum Kumi, Grayson, GA (US)

(73) Assignee: Alcon Inc., Fribourg (CH)

( * ) Notice: Subject to any disclaimer, the term of this patent is extended or adjusted under 35 U.S.C. 154(b) by 541 days.

(21) Appl. No.: 17/661,121

(22) Filed: Apr. 28, 2022

(65) Prior Publication Data

US 2022/0365371 A1   Nov. 17, 2022

Related U.S. Application Data

(60) Provisional application No. 63/181,534, filed on Apr. 29, 2021.

(51) Int. Cl.
| | |
|---|---|
| *G02C 7/10* | (2006.01) |
| *A63H 3/02* | (2006.01) |
| *A63H 3/52* | (2022.01) |
| *G02B 1/04* | (2006.01) |
| *G02C 7/04* | (2006.01) |

(52) U.S. Cl.
CPC ............ *G02C 7/102* (2013.01); *A63H 3/02* (2013.01); *A63H 3/52* (2013.01); *G02B 1/043* (2013.01); *G02C 7/044* (2013.01); *G02C 7/046* (2013.01); *G02C 7/108* (2013.01)

(58) Field of Classification Search
None
See application file for complete search history.

(56) References Cited

U.S. PATENT DOCUMENTS

| | | |
|---|---|---|
| 3,536,386 A | 10/1970 | Spivack |
| 4,444,711 A | 4/1984 | Schad |
| 4,460,534 A | 7/1984 | Boehm et al. |
| 4,536,554 A | 8/1985 | Lim et al. |
| 4,582,402 A | 4/1986 | Knapp |
| 4,668,240 A | 5/1987 | Loshaek |
| 4,704,017 A | 11/1987 | Knapp |
| 4,983,702 A | 1/1991 | Müller et al. |
| 5,034,166 A | 7/1991 | Rawlings et al. |
| 5,087,392 A | 2/1992 | Burke et al. |
| 5,583,163 A | 12/1996 | Müller |
| 5,656,210 A | 8/1997 | Hill et al. |

(Continued)

FOREIGN PATENT DOCUMENTS

| | | |
|---|---|---|
| EP | 1589367 A1 | 10/2005 |
| EP | 2927734 A1 | 10/2015 |

(Continued)

*Primary Examiner* — Robert E. Tallman
(74) *Attorney, Agent, or Firm* — Sheng-Hsin Hu

(57) ABSTRACT

The invention is directed to a colored cosmetic photochromic contact lens, comprising: a pupil section, a generally annular iris section surrounding the pupil section, wherein at least the pupil section is photochromic, wherein the iris section having a colored, printed, opaque, intermittent pattern, wherein the said pattern is covered by a clear ink layer, wherein the clear ink layer is on outer surface of lens to the observer.

11 Claims, 7 Drawing Sheets

(56) References Cited

U.S. PATENT DOCUMENTS

| | | | |
|---|---|---|---|
| 5,843,346 | A | 12/1998 | Morrill |
| 5,894,002 | A | 4/1999 | Boneberger et al. |
| 6,303,687 | B1 | 10/2001 | Müller |
| 6,479,587 | B1 | 11/2002 | Stockinger et al. |
| 6,627,124 | B1 | 9/2003 | Hlerbrechtsmeier et al. |
| 6,800,225 | B1 | 10/2004 | Hagmann et al. |
| 10,816,822 | B2 | 10/2020 | Duis et al. |
| 2001/0050753 | A1 | 12/2001 | Tucker |
| 2003/0184710 | A1 | 2/2003 | Tucker |
| 2003/0085934 | A1 | 5/2003 | Tucker |
| 2003/0119943 | A1 | 6/2003 | Tucker et al. |
| 2004/0178541 | A1 | 9/2004 | Kelly et al. |
| 2005/0113549 | A1 | 5/2005 | Devlin et al. |
| 2011/0249234 | A1* | 10/2011 | Duis ...................... G02C 7/102 351/159.61 |
| 2012/0147319 | A1* | 6/2012 | Corti ...................... G02C 7/046 351/159.3 |
| 2015/0144850 | A1* | 5/2015 | Breitkopf ............. C09D 17/007 252/586 |
| 2017/0276959 | A1 | 9/2017 | Bowers |
| 2018/0095296 | A1 | 4/2018 | Lin |
| 2020/0362082 | A1 | 11/2020 | Lang et al. |

FOREIGN PATENT DOCUMENTS

| | | |
|---|---|---|
| EP | 2652544 B1 | 8/2020 |
| JP | 2002507001 A | 3/2002 |
| JP | 2013546027 A | 12/2013 |
| JP | 2015045877 A | 3/2015 |
| JP | 2017173824 A | 9/2017 |
| WO | 9946630 A1 | 9/1999 |
| WO | 2004052631 A2 | 6/2004 |
| WO | 2012082710 A1 | 6/2012 |

\* cited by examiner

COLORED COSMETIC PHOTOCHROMIC CONTACT LENSES

The present invention generally relates to a colored cosmetic photochromic contact lens, comprising: a pupil section, a generally annular iris section surrounding the pupil section, wherein at least the pupil section is photochromic, wherein the iris section having a colored, printed, opaque, intermittent pattern, wherein the said pattern is covered by a clear ink layer, wherein the clear ink layer is on outer surface of lens to the observer. The present invention also relates to a method for making a cosmetic photochromic contact lens.

BACKGROUND OF THE INVENTION

More recently, efforts have been directed towards photochromic contact lenses that can be worn daily and that quickly transition between colored and uncolored states utilizing photochromic dyes capable of absorbing light in specific wavelength ranges. In some examples, a dye is dispensed in a lens capable of exhibiting photochromism in the polymeric material comprising the contact lens so as to preferably have a single layer capable of absorbing light. However, in a photochromic contact lens while the lens is in the activated state, the entire lens turns to a dark color over the entire pupil and iris creating an undesirable look for the wearer.

Therefore, there is a need for improving a photochromic contact lens.

SUMMARY OF THE INVENTION

In one aspect, the invention provides a cosmetic photochromic contact lens, comprising: a pupil section, a generally annular iris section surrounding the pupil section, wherein at least the pupil section is photochromic, wherein the iris section having a colored, printed, opaque, intermittent pattern, wherein the said pattern is covered by a clear ink layer, wherein the clear ink layer is on outer surface of lens to the observer, wherein said pattern comprising: a) an annular pattern of a color having a first shade, wherein the annular pattern is composed of colored dots which are opaque, and the annular pattern has a substantially even outer peripheral edge and a substantially even inner peripheral edge, and the outer peripheral edge can have a diameter of from about 13.5 mm to about 12.5 mm and the inner peripheral edge can have a diameter of from about 5 mm to about 7 mm, and at least at least one other colored patterns extending across a portion of the iris section selected from a group of patterns consisting of outermost starburst pattern, outer starburst pattern and inner starburst pattern, wherein the outermost starburst pattern comprising dots of a second shade, the outer starburst pattern comprising dots of a third shade and inner starburst pattern comprising dots of a fourth shade, wherein all four shades are either the same or different from each other shade, wherein sizes of the colored dots and/or amounts of space between the colored dots of the annular colored pattern are varied in a radially-controlled manner so that local colored dot coverage increases in a radial direction from the inner perimeter of the annular iris section to the outer perimeter of the annular iris section, wherein annular colored pattern has a size sufficient to cover the most or the whole iris of an eye to make changes to the color of the eye or enhance the color of the eye, and wherein the combination of the substantially-annular colored pattern and the other color patterns to mask or reduce the abnormal appearance from the viewer by creating the appearance of blending in the dark colors with the colored, printed, opaque, intermittent pattern of iris section while the photochromic lens is in the activated state.

In another respect, this invention relates to a method for making a colored color blindness contact lens, comprising the steps of:
(a) providing a mold including a first mold half having a first molding surface defining the anterior surface of a contact lens and a second mold half having a second molding surface defining the posterior surface of the contact lens, wherein the first and second mold halves are configured to receive each other such that a contact lens forming cavity is formed between the first and second molding surfaces;
(b) applying a clear ink layer onto at least one of molding surfaces of a lens mold to cover at least an iris portion of the mold surface,
(c) at least partially curing the clear ink layer with a UV/visible light,
(d) applying, by using pad-transfer or inkjet printing technique, at least one ink layer with cosmetic pattern selected from a group consisting of outermost starburst pattern, outer starburst and inner starburst pattern onto at least the one of mold surface, each of said portions overlapping each other at a plurality of points,
(e) applying, by using pad-transfer or inkjet printing technique, an annular colored pattern onto at least the one of mold surface, wherein the annular pattern is composed of colored dots which are opaque, wherein sizes of the dots and/or amounts of space between the dots of the annular colored pattern are varied in a radially-controlled manner so that local colored dot coverage increases in a radial direction from the inner perimeter of the annular iris section to the outer perimeter of the annular iris section
f) at least partially curing the colored pattern ink layers with a UV/visible light
g) applying, by using pad-transfer or inkjet printing technique, a second clear ink layer onto at least the one of molding surfaces after step of (g) to cover at least a central portion of the least of the one of mold surface,
(h) partially or completely curing the ink layers printed on the mold to convert the ink layer coatings to a film;
(j) dispensing a lens-forming material containing photochromate into the lens-forming cavity; and
(k) curing the lens-forming material within the lens-forming cavity to form a colored contact lens, whereby the film detaches from the molding surface and becomes integral with the body of the contact lens, wherein the film becomes part of one of the anterior and posterior surface of the colored cosmetic photochromic contact lens.

These and other aspects of the invention will become apparent from the following description of the preferred embodiments taken in conjunction with the following drawings. As would be obvious to one skilled in the art, many variations and modifications of the invention may be affected without departing from the spirit and scope of the novel concepts of the disclosure.

DETAILED DESCRIPTION OF THE PREFERRED EMBODIMENTS

Figure 1:
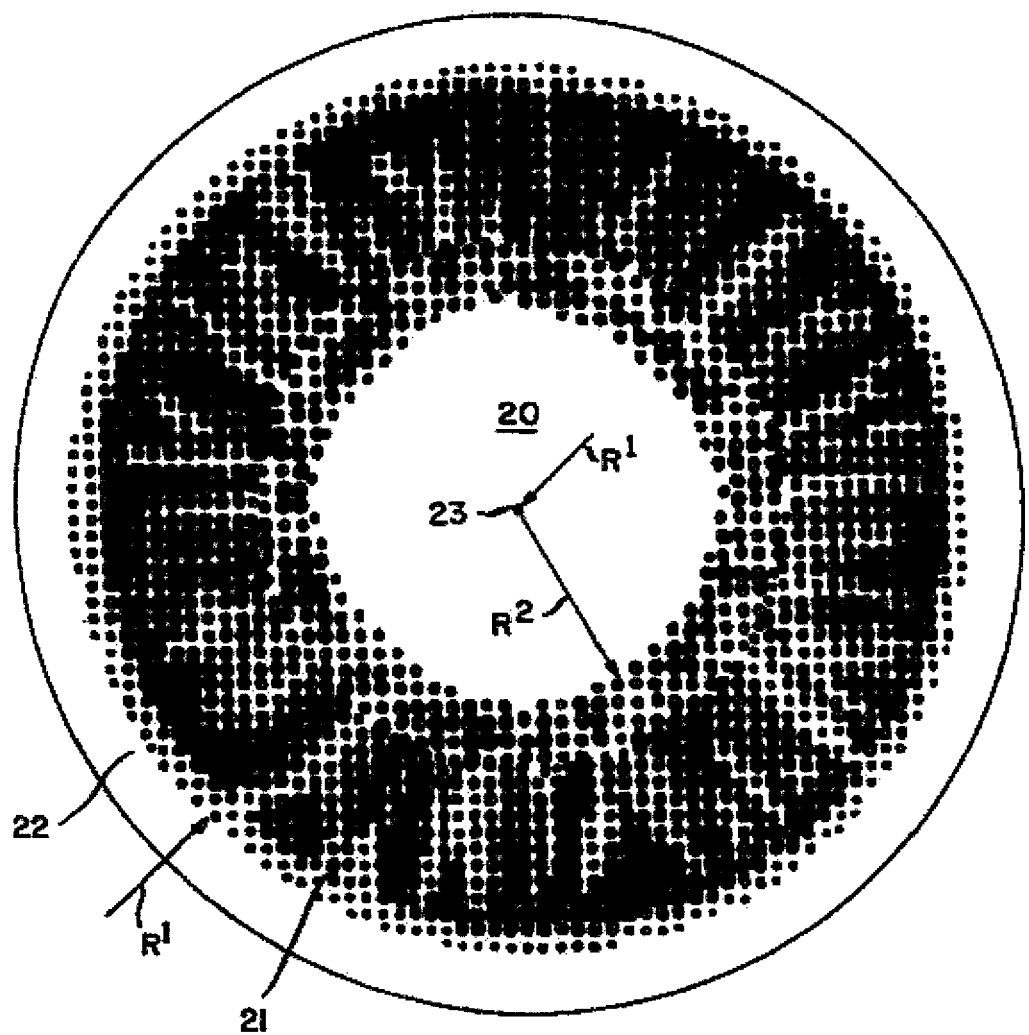
FIG. 1 illustrates a prior art contact lens.

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

A "contact lens" refers to an object that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A contact lens can be tinted before printing any color patterns. A contact lens can be in a dry state or a wet state. "Dry State" refers to a soft lens in a state prior to hydration or the state of a hard lens under storage or use conditions. "Wet State" refers to a soft lens in a hydrated state.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "colored contact lens" refers to a contact lens (hard or soft) having a color image printed thereon. A color image can be a cosmetic pattern, for example, iris-like patterns, Wild Eye™ patterns, made-to-order (MTO) patterns, and the like; an inversion mark that allows a user to handle and insert easily a contact lens; a toric rotation mark, or contact lenses stock keeping units (SKUs), for example, either in forms of numbers or as bar codes. A color image can be a single color image or a multi-color image. A color image is preferably a digital image, but it can also be an analog image.

The term "eye color" refers to the color of the iris.

The term "ordinary viewer" is intended to mean a person having normal 20/20 version standing about 5 feet from a person wearing the lenses of the invention.

The term "non-opaque" as used herein is intended to describe transparent or translucent color or a part of the lens that is uncolored or colored with transparent or translucent coloring.

A "colored coat" refers to a coating on an object and having a color image printed therein.

A "colorant" means either one or more dyes or one or more pigments or a mixture thereof that is used to print a pattern of colored elements on a contact lens.

"Dye" means a substance that is soluble in a solvent and that is used to impart color. Dyes are typically transparent or translucent and absorb but do not scatter light. Dyes can cover both optical regions of contact lenses and non-optical regions of contact lenses.

A "pigment" means a powdered substance that is suspended in a liquid in which it is insoluble. Pigments are used to impart color. Pigments, in general, are more opaque than dyes.

The term "a conventional or non-pearlescent pigment" as used herein is intended to describe any absorption pigments that impart color based on the optical principle of diffuse scattering and its color is independent of its geometry. While any suitable non-pearlescent pigment may be employed, it is presently preferred that the non-pearlescent pigment is heat resistant, non-toxic and insoluble in aqueous solutions. Examples of preferred non-pearlescent pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom D M Handbook of U.S. Colorants for a list of colorants that may be used with the present invention. A more preferred embodiment of a non-pearlescent pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

An "uneven or jagged or irregular border or peripheral edge" as used herein refers to a border or a peripheral edge on which positions have radial distances (i.e., from the lens center) which differ from each other by at least about 10%. A "substantially even border or peripheral edge" as used herein refers to a border or a peripheral edge on which positions have substantially constant radial distances (i.e., from the lens center), namely differing from each other less than 10%.

"Hydrogel" means a cross-linked polymer having an equilibrium content between about 10 and 90 percent water.

A "lens-forming material" refers to a polymerizable composition which can be can be (cured (i.e., polymerized and/or crosslinked) thermally or actinically (i.e., by actinic radiation) to obtain a crosslinked polymer. Examples of actinic radiation are UV irradiation, ionized radiation (e.g. gamma ray or X-ray irradiation), microwave irradiation, and the like. Thermal curing or actinic curing methods are well-known to a person skilled in the art. Lens-forming materials are well known to a person skilled in the art.

The term "ethylenically unsaturated group" or "olefinically unsaturated group" is employed herein in a broad sense and is intended to encompass any groups containing at least one >C=C< group. Exemplary ethylenically unsaturated groups include without limitation acryloyl, methacryloyl, allyl, vinyl, styrenyl, or other C=C containing groups.

A "HEMA-based hydrogel" refers to a hydrogel obtained by copolymerization of a polymerizable composition comprising hydroxyethyl methacrylate (HEMA).

A "silicone hydrogel" refers to a hydrogel obtained by copolymerization of a polymerizable composition comprising at least one silicone-containing monomer or at least one silicone-containing macromer.

"Hydrophilic," as used herein, describes a material or portion thereof that will more readily associate with water than with lipids.

A "prepolymer" refers to a starting polymer which can be cured (e.g., crosslinked and/or polymerized) actinically or thermally or chemically to obtain a crosslinked and/or polymerized polymer having a molecular weight much higher than the starting polymer. A "crosslinkable prepolymer" refers to a starting polymer which can be crosslinked upon actinic radiation to obtain a crosslinked polymer having a molecular weight much higher than the starting polymer.

A "monomer" means a low molecular weight compound that can be polymerized. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

A "hydrophilic vinylic monomer", as used herein, refers to a vinylic monomer which as a homopolymer typically yields a polymer that is water-soluble or can absorb at least 10 percent by weight water. Suitable hydrophilic monomers are, without this being an exhaustive list, hydroxyl-substituted lower alkyl ($C_1$ to $C_8$) acrylates and methacrylates, acrylamide, methacrylamide, (lower allyl)acrylamides and -methacrylamides, ethoxylated acrylates and methacrylates, hydroxyl-substituted (lower alkyl)acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl-4,4'-dialkyloxazolin-5-one, 2- and 4-vinylpyridine, vinylically unsaturated carboxylic acids having a total of 3 to 5 carbon atoms, amino(lower alkyl)- (where the term "amino" also includes quaternary ammonium), mono(lower alkylamino) (lower alkyl) and di(lower alkylamino)(lower alkyl)acrylates and methacrylates, allyl alcohol and the like.

A "hydrophobic vinylic monomer", as used herein, refers to a vinylic monomer which as a homopolymer typically yields a polymer that is insoluble in water and can absorb less than 10 percent by weight water.

A "macromer" refers to a medium and high molecular weight compound or polymer that contains functional groups capable of undergoing further polymerizing/crosslinking reactions. Medium and high molecular weight typically means average molecular weights greater than 700 Daltons. Preferably, a macromer contains ethylenically unsaturated groups and can be polymerized actinically or thermally.

A "polymer" means a material formed by polymerizing/crosslinking one or more monomers.

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis (2,4-dimethylpentanenitrile) 2,2'-azobis (2-methylpropanenitrile), 2,2'-azobis (2-methylbutanenitrile), peroxides such as benzoyl peroxide, and the like. Preferably, the thermal initiator is 2,2'-azobis(isobutyronitrile) (AIBN).

An "interpenetrating polymer network (IPN)" as used herein refers broadly to an intimate network of two or more polymers at least one of which is either synthesized and/or crosslinked in the presence of the other(s). Techniques for preparing IPN are known to one skilled in the art. For a general procedure, see U.S. Pat. Nos. 4,536,554, 4,983,702, 5,087,392, and 5,656,210, the contents of which are all incorporated herein by reference. The polymerization is generally carried out at temperatures ranging from about room temperature to about 145° C.

A "print-on-mold process for producing colored contact lenses" refers to a process for molding a colored contact lens described in U.S. Pat. No. 5,034,166 to Rawlings et al. (herein incorporated by reference).

A "good transferability from a mold to a contact lens" in reference to an ink or a colored coat means that a color image printed on a molding surface of a mold with the ink can be transferred completely onto a contact lens cured (thermally or actinically) in that mold.

The term "surfactant," as used herein, refers to a surface-active compound as that term is well known in the art.

A "crosslinker" refers to a compound comprising two or more functional groups as they are known in the art. A crosslinker molecule can be used to crosslink two or more monomers or polymer molecules. Any known suitable crosslinkers can be used in the invention. Exemplary preferred crosslinkers include, without limitation, hexamethyl diisocyanate (HMDI), ethylene glycol dimethacrylate (EGDMA), diethylene glycol dimethacrylate, ethyleneglycol diacrylate, allyl methacrylates, allyl acrylates, 1,3-propanediol dimethacrylate, 1,6-hexanediol dimethacrylate, 1,4-butanediol dimethacrylate, polyethyleneoxide mono- and diacrylates, and 1,4-butanediol diacrylate (BDDA).

A "humectant" refers to a compound that removes water (or humidity) from ink such as that term is known in the art. Examples of humectant include glycerol, ethylene glycol, diethylene glycol, and 1,3-dioxane-5,5-dimethanol. By adding one or more humectants (e.g., glycerol and diethylene glycol), clogging of the nozzles of a printer head can be minimized.

A "spatial limitation of actinic radiation" refers to an act or process in which energy radiation in the form of rays is directed by means of, for example, a mask or screen or combinations thereof, to impinge, in a spatially restricted manner, onto an area having a well defined peripheral boundary. For example, a spatial limitation of UV radiation can be achieved by using a mask or screen which has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the unmasked region.

In general, the invention directs to a colored photochromic contact lens. This invention solves the problems associated with the wearer's appearance of a photochromic contact lens. In a photochromic contact lens while the lens is in the activated state, the lens turns to a dark color over only the pupil section or both the pupil section and iris section creating an undesirable look for the wearer. This invention allows us to mask this appearance with a cosmetic pattern around the optic zone to create the appearance of blending in the photochromic color with the iris, inner and outer limbal ring features.

It is discovered that such undesirable effects are reduced or eliminated by applying a cosmetic pattern to the contact lens. The cosmetic pattern reduces the abnormal appearance from the viewer caused by dark color over the pupil or both the pupil section and iris section by creating the appearance of blending in the corrective colors with the colored, printed, opaque, intermittent pattern of iris section. When the lens is exposed to UV, the pupil section (for pupil-only photochromic contact lens) or entire lens (for whole-photochromic contact lens) becomes a darker color giving an unwanted appearance to the wearer. In this invention, we combine a cosmetic print pattern with a photochromic lens to improve the wearer's appearance. The pattern is either printed on the front curve lens mold and then transferred to the lens or directly printed on lens to give the viewer a more visible cosmetic pattern when the photochromic lens bulk is colored.

For a photochromic lens, a typical UV-VIS absorbance spectra has the peak absorbance at 405 and 490 nm. It is discovered when a high refractive index (RI) TiO2-containing ink that increases light reflectance is printed at the lens surface, the features are reflective enough over the entire visible light range such that they are visible even during lens coloration. According to the present application, high refractive index is defined that the pigment has a refractive index equal to or higher than 2.45. For example, Titanium dioxide (rutile phase) RI is 2.609; Titanium dioxide (anatase phase) RI is 2.488 and Titanium dioxide (brookite phase) RI is 2.583. According to the present application, the ink layer on the iris section comprising the high refractive index pigment 1% (w/w) to 15% (w/w), preferably about 5% (w/w) to 12% (w/w), more preferably about 8% (w/w) to 10% (w/w) 8 to 10 about based on the weight of the ink.

As discussed earlier, there are two kinds of photochromic contact lenses: pupil-only photochromic lens and whole-photochromic contact lens, manufactured as illustrated in U.S. Pat. No. 10,816,822 B2 and US 2020/0362082 A1, respectfully, herein incorporated by references in their entireties.

A colored, printed, opaque, intermittent cosmetic pattern, said pattern comprising: a) an annular pattern of a color having a first shade, wherein the annular pattern is composed of colored dots which are opaque, and the annular pattern has a substantially even outer peripheral edge and a substantially even inner peripheral edge, and the outer peripheral edge can have a diameter of from about 13.5 mm to about 12.5 mm and the inner peripheral edge can have a diameter of from about 5 mm to about 7 mm, and b) at least at least one other colored patterns extending across a portion of the iris section selected from a group of patterns consisting of outermost starburst pattern, outer starburst pattern and inner starburst pattern.

The annular colored pattern has a size sufficient to cover the most or the whole iris of an eye, and wherein the combination of the substantially-annular colored pattern and the other color patterns to mask the abnormal appearance from the viewer caused by red tint over the pupil by creating the appearance of blending in the corrective colors with the colored, printed, opaque, intermittent pattern of iris section In accordance with the present application, a colored cosmetic photochromic contact lens also comprises a clear ink coating covering at least the iris portion of the contact lens. A clear ink coating can be formed on the colored area by applying a layer of a clear ink free of any colorant or pigment onto at least the iris portion of the contact lens. A clear ink coating may minimize contact of the pigment in the iris section or a colorant of the cosmetic pattern in the iris section with the eye and may enhance wearer's comfort.

The contrast of an annular colored background will make the colors of the other color patterns more vibrant and more evident on the final lens, without losing the natural pattern. The underlying annular color layer which could be printed onto an iris zone of at least one of the surface of a contact lens is an annular colored pattern with a radial gradient of color intensity in which the color intensity changes from light to dark in a radial direction from the inner perimeter of the annular iris section to the outer perimeter of the annular iris section. The annular color pattern is composed of opaque colored dots of various sizes with varying amounts of space between them on the annular iris section of a contact lens. Sizes of the dots and/or amounts of space between the dots are controlled in a radially-controlled manner so that colored dot coverage increases in a radial direction from the inner perimeter of the annular iris section to the outer perimeter of the annular iris section. There are fewer or smaller colored dots spaced far apart as approaching the inner perimeter of the annular iris section of the color disk whereas there are more or larger black dots with closer spacing when approaching the outer perimeter of the annular iris section of the color disk. It is believed that, if customers want to enhance their eye color, when looking at such a pattern of colored, the human eye averages it, producing the illusion of a radially-increased color intensity levels (i.e., which increases in a radial direction from the inner perimeter of the annular iris section to the outer perimeter of the annular iris section). The annular color pattern is printed over the annular iris zone of a contact lens preferably using a single colorant which is similar or complimentary to customer's eye color. With such colored pattern, the iris color and texture of an eye underlying a colored contact lens of the invention can show through the colored pattern so as to appear very natural to an ordinary viewer while enhancing the eye color. However, if customers want to change color, the annular color pattern is printed over the annular iris zone of a contact lens preferably using a single colorant which is similar or complimentary to the color to which they want their eye color to change from their natural eye color. In addition, when a colored contact lens printed with the underlying layer further comprises at least two other colored patterns extending across a portion of the iris section selected from a group of patterns consisting of outermost starburst pattern, outer starburst pattern and inner starburst pattern, it can enhance or change color of an eye more effectively while allowing an eye appear very natural to an ordinary viewer.

It is also discovered that such cosmetic effects (i.e., enhancing or changing a wearer's eye color while providing a very natural appearance) can be achieved by applying at least two other color patterns onto the contact lens first and then printing an annular layer of color ink on top of the two other color patterns layer.

Furthermore, the above described a colored contact lens printed with the underlying layer and at least two other colored patterns could still further comprises a black limbal ring on the annular iris section near its outer peripheral edge, it can allow an eye to appear more "youthful" to an ordinary viewer.

The term "limbal ring" is intended to mean an annular band of color that, when the lens is on-eye and centered, partially or substantially completely overlies the lens wearer's limbus area. The limbus area is the area of the eye located between the iris area and the sclera area. Preferably, the limbal ring substantially completely overlies the limbus area. The innermost border, or edge closest to the geometric center of the lens, of the limbal ring may be about 5 mm to about 12 mm, preferably about 6 to about 11.5 mm, even more preferably about 9 to about 11 mm, from the lens' geometric center. The ring may be of any suitable width and preferably is about 0.5 to about 2.5 mm in width, more preferably about 0.75 to about 1.75 mm in width, or even more preferably about 0.8 to about 1.25 mm in width.

The limbal ring surrounds an outer starburst pattern or an annular color pattern, wherein the limbal ring is comprised of a colorant, wherein the limbal ring has an interior peripheral edge and an exterior peripheral edge, wherein the exterior peripheral edge is substantially even, wherein the interior peripheral edge is uneven (or jugged or irregular) or substantially even.

The interior peripheral edge of a limbal ring refers to an edge being closest to the center of the colored lens. The exterior peripheral edge of a limbal ring refers to an edge being farthest from the center of the colored lens. The limbal ring partially or substantially completely overlies a lens wearer's limbal region when the lens is on-eye.

By having a colored limbal ring on the colored outer starburst pattern or on the colored outer most starburst pattern, a colored contact lens of the invention can allow an eye to appear more "youthful" to an ordinary viewer, if limbal ring is of a color similar to the natural color of the iris, or limbal ring is of a color the same as the natural color of the iris but having a lower lightness, or limbal ring is of a darker color than the natural color of the iris.

By having a colored limbal ring on the colored outer starburst pattern on the colored outer most starburst pattern, a colored contact lens of the invention can define or emphasize the natural color of the iris.

The limbal ring can be comprised of any shaped pigmented areas, preferably, opaque dots. Preferred the limbal ring comprised of evenly spaced circular voids.

In one respect, the invention provides a cosmetic photochromic contact lens, comprising: a pupil section, a generally annular iris section surrounding the pupil section, wherein at least the pupil section is photochromic, wherein the iris section having a colored, printed, opaque, intermittent pattern, wherein the said pattern is covered by a clear ink layer, wherein the clear ink layer is on outer surface of lens to the observer, wherein said pattern comprising: a) an annular pattern of a color having a first shade, wherein the annular pattern is composed of colored dots which are opaque, and the annular pattern has a substantially even outer peripheral edge and a substantially even inner peripheral edge, and the outer peripheral edge can have a diameter of from about 13.5 mm to about 12.5 mm and the inner peripheral edge can have a diameter of from about 5 mm to about 7 mm, and at least at least one other colored patterns extending across a portion of the iris section selected from a group of patterns consisting of outermost starburst pattern, outer starburst pattern and inner starburst pattern, wherein the outermost starburst pattern comprising dots of a second shade, the outer starburst pattern comprising dots of a third shade and inner starburst pattern comprising dots of a fourth shade, wherein all four shades are either the same or different from each other shade, wherein sizes of the colored dots and/or amounts of space between the colored dots of the annular colored pattern are varied in a radially-controlled manner so that local colored dot coverage increases in a radial direction from the inner perimeter of the annular iris section to the outer perimeter of the annular iris section, wherein annular colored pattern has a size sufficient to cover the most or the whole iris of an eye to make changes to the color of the eye or enhance the color of the eye, and wherein the combination of the substantially-annular colored pattern and the other color patterns to mask or reduce the abnormal appearance from the viewer by creating the appearance of blending in the dark colors with the colored, printed, opaque, intermittent pattern of iris section while the photochromic lens is in the activated state.

It is understood that in an annular pattern of a color of the present invention two or more neighboring dots may connect with each other at a certain value of local colored dot coverage. It is also understood that there may exist some fluctuations in local colored dot coverage in a radial direction as long as the general trend in local colored dot coverage in a radial direction is increased.

As used herein, "local colored dot coverage" or "local colored dot density" or "dot coverage" or "dot density" is defined by equation (1)

$$C(x_i, y_j) = \frac{A_{dot}(x_i, y_j)}{A_{dot}(x_i, y_j) + A_{space}(x_i, y_j)} \quad (1)$$

in which $C(x_i, y_j)$ is a local colored dot coverage (or local colored dot density or dot coverage or dot density) determined within a local area with its center located at a position $(x_i, y_j)$ and with a length of $(2\Delta x)$ and a width of $(2\Delta y)$, $A_{dot}(x_i, y_j)$ is the area of dot(s) within $(2\Delta x)\cdot(2\Delta y)$, and $A_{space}(x_i, y_j)$ is the area of space between dots within $2\Delta x \cdot 2\Delta y$. Equation (1) is based on Cartesian coordinate system. It should be understood that other coordinate systems, such as Polar coordinate system $(r_i, \theta_j)$, can also be used. A person skilled in the art will understood very well how to convert Polar to Cartesian coordinates or vice versa. Any known methods known to a person skilled in the art can be used to determine a local colored dot coverage. For example, one can first divide a lens surface with a colored pattern into a grid of any defined areas (e.g., $2\Delta x=2\Delta y=1$ mm), measure the area covered by dot(s) and/or dot portions within each area, and then calculate the local colored dot coverage at a position (i, j) which is the center of each area.

In accordance with the present invention, space between dots can be colored with a different color or lightly tinted or preferably clear (non-color).

As well known in the art, a color is generally described mainly by the following inter-related terms: hue, chroma, intensity, saturation, luminance, brightness value and opacity.

The term "different shades" is intended to describe that two shades are different in at least one of hue, chroma, intensity, saturation, luminance, brightness value, and opacity.

In accordance with a preferred embodiment, a local colored dot coverage $C(x_i, y_j)$ is varied in a way that $A_{dot}(x_i, y_j)$ increases gradually whereas $A_{space}(x_i, y_j)$ decreases gradually in a radial direction (i.e., from the center to the edge of the lens). One way to achieve this effect is to fix the spacing of the center of each dot while to increase the sizes of dots located in a local area. The resulting space between the dots becomes smaller. The farther from the center a dot is located, the larger its size is. Dots located near the peripheral of a central zone of a lens can have a larger size and cover larger area, thereby causing the periphery of the central zone of the lens to appear darker than the center.

Alternatively, one can gradually increase local colored dot coverage in a radial direction (from the center to the edge or a position near the edge of the central zone) by keeping the size of each dot substantially constant while adding one or more dots in a given local area. The larger number of colored dots within an area near the periphery of a central zone of a lens causes the appearance of a darker periphery than the center of the central zone.

In accordance with a preferred embodiment, the colored annular pattern has a profile of local colored dot coverage which can be defined by at least one mathematical function. Any mathematical functions can be used. Exemplary mathematical functions include conic functions, quadric functions, polynomials of any degree, exponential functions, trigonometric functions, hyperbolic functions, rational functions, Fourier series, wavelets, and the like. Examples of preferred mathematical function include linear functions, polynomial functions of any degree, trigonometric functions, exponential functions, hyperbolic functions, and combinations thereof.

In a preferred embodiment, the profile of local colored dot coverage is rotationally-symmetric and defined by at least one of equations (2), (3) and (4) or combinations thereof $$C(r) = b_0 + a_0 \cdot \sin\left(\frac{r}{2R}\pi\right) \quad (2)$$

$$C(r) = \sum c_j \left(\frac{r}{R}\right)^{(1+j)} \quad (3)$$

$$\begin{cases} C(r) = b_1 + k_1 \frac{r}{R} & 0 \leq r < r_1 \\ C(r) = b_2 + k_2 \frac{r}{R} & r_1 \leq r < r_2 \\ \vdots \\ C(r) = b_i + k_i \frac{r}{R} & r_{i-1} \leq r < r_i \\ \vdots \end{cases} \quad (4)$$

in which $C(r)$ is a local colored dot coverage at a distance of r from the center; $a_0$, $b_i$, $c_j$, and $k_i$ are coefficients; and R is the radius of a color disk. In Cartesian coordinate system in which the center of the color disk is located at (0, 0), $r = \sqrt{x_i^2 + y_j^2}$.

In another preferred embodiment, the profile of local colored dot coverage is axial symmetric with respect to a given angle (e.g., 30°, 36°, 45°, 60°, 72°).

The opaque colored dots can have any shape, regular or irregular, such as circular, oval, triangular, square, hexagonal, elongated, etc. All of dots can have similar or different shapes. Preferably, all dots have substantially similar shape. More preferably, all dots have circular shapes.

The range of dot diameter is preferably from 0 to about 0.2 mm. The spacing between dots is preferred from 0 to about 0.2 mm outside of the central area.

In accordance with the present invention, at least two other patterns extending across a portion of the iris section selected from a group of patterns consisting of outermost starburst pattern, outer starburst pattern and inner starburst pattern can be added on top of or below the substantially-annual pattern of dots. Other printed patterns meant to add additional colorant structures or accents to the iris, or striations meant to add texture to the iris.

It should be understood that any shape of a zone, an area, a colored pattern, or the like in reference to a contact lens intends to refer to the shape of the zone, the area, the colored pattern, or the like projected onto a plane perpendicular to an axis passing through the apex of the contact lens in normal direction.

Any colorant can be used in printing a colored pattern of the invention, as long as the colorant can provide opaque colored dots. Exemplary colorants include pigments. The pigments should be small enough in size to scatter little visible light. Preferably, the size of pigment is smaller than about 1 micron.

FIG. 1 as an example illustrates a prior art contact lens. It has a non-opaque pupil section 20 in the center of lens, and an annular iris section 21 surrounding the pupil section. For hydrophilic lenses, a transparent peripheral section 22 surrounds iris section 21. A colored, opaque, intermittent pattern is located over the entire iris section 21, as show in FIG. 1. The pattern leaves a substantial portion of the iris section within the interstices of the pattern non-opaque. The non-opaque areas of iris section 21 appear white in FIG. 1.

Figure 2:
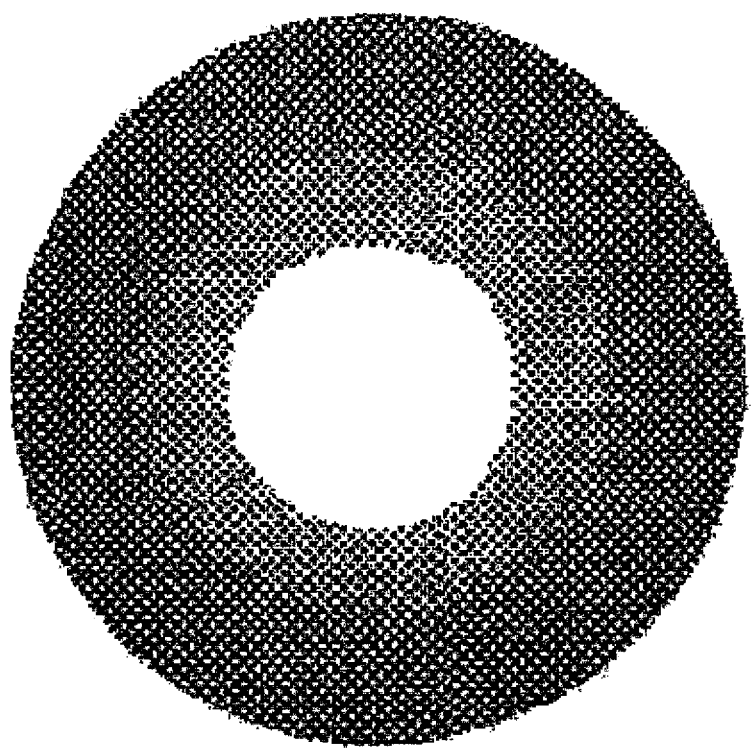
FIG. 2 illustrates an annular color pattern which is a pattern of annular ring of a gradient dot matrix in accordance with the present invention.

FIG. 2 as an example schematically illustrates an example of an annular color pattern which consists of an annular ring of gradient dot matrix. The dots, preferably opaque dots, can have any shape, regular or irregular, such as circular, oval, triangular, square, hexagonal, elongated, etc. All dots can have similar or different shapes. Preferably, all dots have substantially similar shape. More preferably, all dots have circular shapes. The first print pattern is concentric with the center of a lens and has a substantially even outer peripheral edge and a substantially even inner peripheral edge. The outer peripheral edge can have a diameter of from about 13.5 mm to about 12.5 mm and the inner peripheral edge can have a diameter of from about 5 mm to about 7 mm. The annular colored pattern has a size sufficient to cover the most or the whole iris of an eye, and wherein the combination of the substantially-annular colored pattern and the other color patterns to mask the abnormal appearance from the viewer caused by red tint over the pupil by creating the appearance of blending in the corrective colors with the colored, printed, opaque, intermittent pattern of iris section.

The dot coverage (print area) for the annular color is at least 10 percent, or from about 10 percent to about 35 percent, preferably from about 20 percent to about 30 percent, more preferably about 25 percent of the contact lens area excluding the outer transparent peripheral area (section 22 in FIG. 1). The outer transparent peripheral area is the area outside annular color pattern print area and is un-printed area. This area corresponds to the sclera of the eye outer periphery. The term "percent of print coverage or dot coverage" refers to the portion of the total area within the region covered by the color dots as measured by using Adobe Photoshop (a graphics image editing software) to determine the number of pixels on an area. The percent of print coverage is calculated as follows:

% print coverage=[(number of pixels of dot coverage area)/(number of pixels of a total area)]×100

Total area=printed area+un-printed area

The improvement of this invention is to combine an annular color pattern with at least two other color patterns that greatly improves the effectiveness of enhancing or changing natural color of the wear's eye while maintaining natural appearance of the wearer's iris. The at least two other color patterns are selected from a group of patterns consisting of outermost starburst pattern, outer starburst pattern and inner starburst pattern. To produce this improvement, the at least two other colored patterns are printed in two or more portions, in addition to the annular color pattern as described above. Accordance with the present invention, the elements of the at least two other patterns are preferably dots, and especially preferred are dots, some of which run together. The at least two other patterns are opaque and can be made up of dots having regular or irregular, uniform or non-uniform shapes, for example, round, square, hexagonal, elongated, or other dot shapes.

Figure 3:
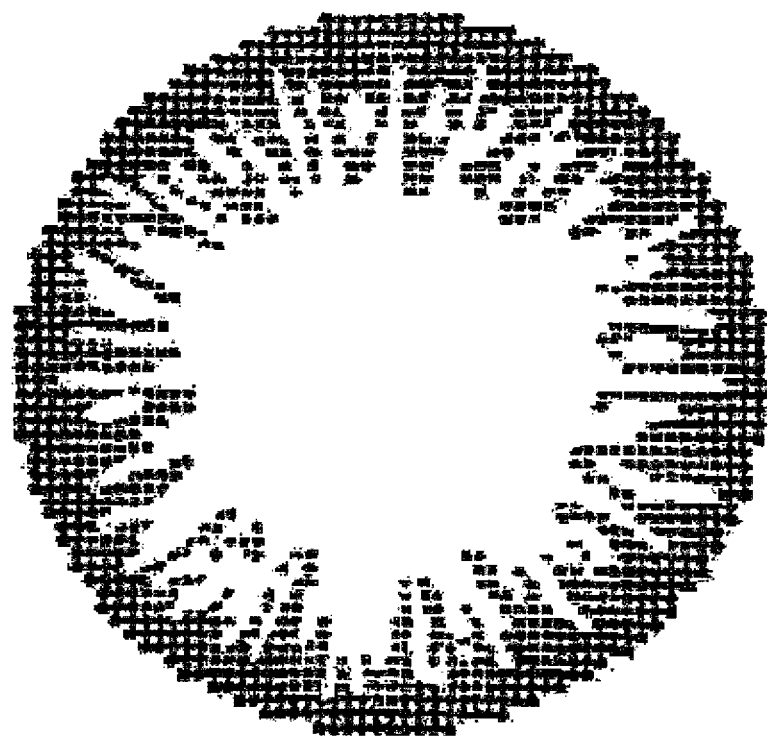
FIG. 3 illustrates an "outer most starburst pattern" in accordance with the present invention.

A first portion of the elements of the at least two other patterns are of a second shade (a first shade is in annular color pattern) and generally have a greatest concentration of dots or other elements located generally on the outside of, but within, the iris section, i.e. at or near the outer perimeter of the annular iris section. This section may be printed with the outermost starburst. The outermost starburst pattern is shown in FIG. 3. Black, or some other dark color such as gray, dark-brown or dark blue, is most often used as the color of the outermost starburst.

A second portion of the elements are a third shade, which is different from the second shade, and has elements with a greatest concentration located generally on the inside of the outermost star-burst, and generally, although not always, surrounded by the outermost starburst portion. This section may be printed with the outer starburst pattern. The outer starburst pattern appears in FIG. 4. The outer starburst pattern can be many colors, for example, blue, gray, brown, light blue, turquoise, violet, blue-violet, aqua, yellow or green.

A third portion of the elements are of a fourth shade, which is different from the third shade and either the same or different from the second shade. This third portion has a greatest concentration of elements located generally, but not always, on the inside of the other two portions. Generally, the greatest concentration of elements of the third portion is surrounded by the concentration of elements of the other two portions. This section may be printed with the inner starburst appears in FIG. 5.

The percent of print coverage or dot coverage of the combination of annular color pattern and the at least other patterns is between 30 and 80 percent, preferably cover between 40 and 65 percent, more preferably cover between 45 and 60 percent of the of the contact lens area excluding the outer transparent peripheral area (section 22 in FIG. 1). The outer transparent peripheral area is the area outside the print area and is un-printed area. This area corresponds to the sclera of the eye. Therefore, a substantial portion of the iris section within the interstices of the pattern is non-opaque. The patterns that make up the portions of the iris can be islands of color or worms, corkscrews, starbursts, spokes, spikes, striations, radial stripes, zig-zags and streaks. In certain cases, a single color background is used to complement the multi-pattern design. These patterns blend with each other to provide a colored contact lens that enhances the structure of the iris of a person wearing the lens. The term "percent of print coverage or dot coverage" refers to the portion of the total area within the region covered by the color dots as measured by using Adobe Photoshop (a graphics image editing software) to determine the number of pixels on an area. The percent of print coverage is calculated as follows:

% print coverage=[(number of pixels of dot coverage area)/(number of pixels of a total area)]×100

Total area=printed area+un-printed area

Figure 4:
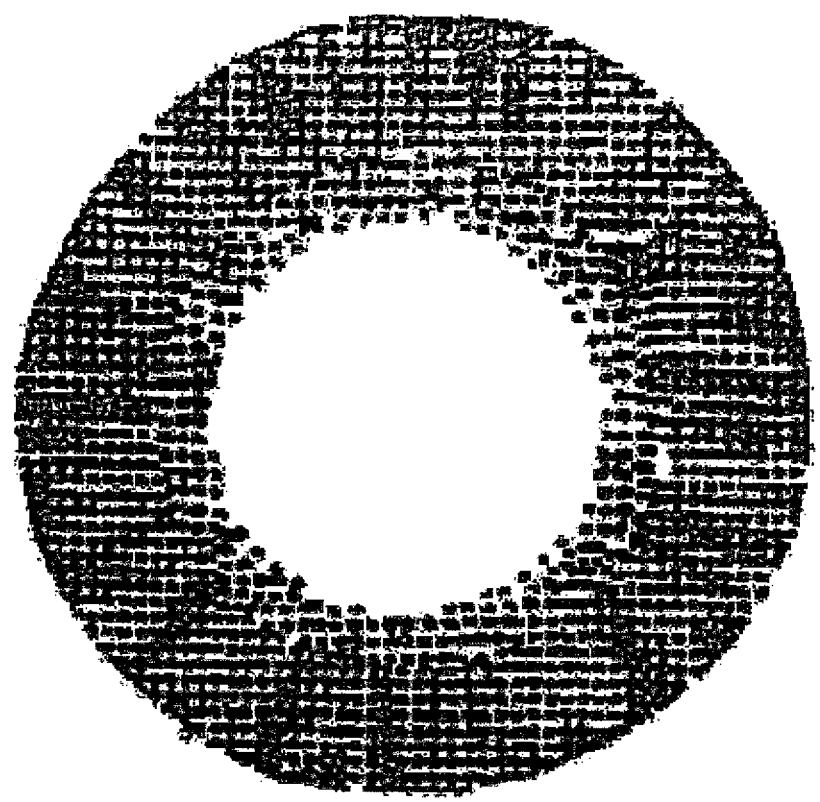
FIG. 4 illustrates an "outer starburst pattern" in accordance with the present invention.
Figure 5:
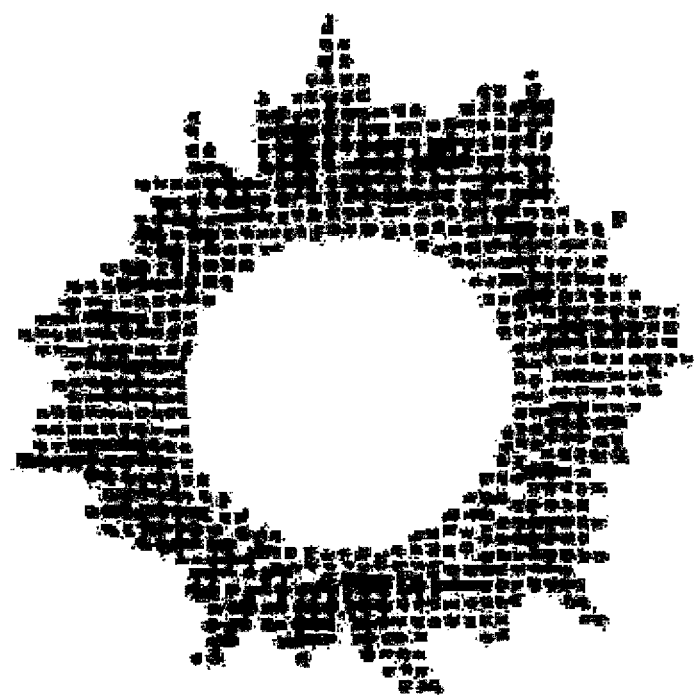
FIG. 5 illustrates an "inner starburst pattern" in accordance with the present invention FIG. 6 as an example schematically illustrates a "limbal ring with evenly spaced circular voids"

In a preferred embodiment, a first uneven border differentiates the outermost starburst and the outer starburst portions of the pattern elements; however, the elements of the outermost and outer starbursts overlap, mix and blend together, either in actuality or merely in perception, to create the desired effect. A second uneven border differentiates the outer starburst and the inner starburst portions of the pattern, the elements of the outer and inner starbursts overlap, mix and blend together, either in actuality or in perception. If the patterns of FIGS. 3, 4 and 5 are merged to form a three color lens, not include the color of the annular pattern which may or may not have the same color of outmost starburst patter, out starburst pattern and inner starburst pattern, the uneven edge of the pattern shown in FIG. 3 will merge and overlap with the pattern shown in FIG. 4 to form the first uneven border between the outermost and outer starbursts. Further, the uneven edge of the pattern shown in FIG. 5 will merge and overlap with the pattern shown in FIG. 4 to form the second uneven border between the outer and inner starbursts.

In certain patterns, the outer starburst may contain pattern that extends further toward the periphery of the lens than the pattern of the outermost starburst. In other patterns, the outer starburst may contain pattern that extends further toward the pupil section of the lens than the pattern of the inner starburst.

Alternative embodiments of the present invention include minimum and maximum distances of the uneven borders from the outer perimeter of the iris section. For example in one alternative embodiment, the minimum distance of the first uneven border from the outer perimeter of the iris section is from about 5% to about 60% of the radial width of the iris section, and the maximum distance of the uneven border from the outer perimeter of the iris section is from about 25% to about 95% of the radial width of the iris section, and the minimum distance of the second uneven border from the outer perimeter of the iris section is from about 15% to about 75% of the radial width of the iris section, and the maximum distance of the uneven border from the outer perimeter of the iris section is from about 50% to about 95% of the radial width of the iris section.

In another embodiment, the minimum distance of the first uneven border from the outer perimeter of the iris section is from about 15% to about 50% of the radial width of the iris section, and the maximum distance of the uneven border from the outer perimeter of the iris section is from about 45% to about 95% of the radial width of the iris section, and the minimum distance of the second uneven border from the outer perimeter of the iris section is from about 15% to about 65% of the radial width of the iris section, and the maximum distance of the uneven border from the outer perimeter of the iris section is from about 60% to about 95% of the radial width of the iris section.

In yet another alternative embodiment, the outer starburst pattern may extend to the periphery of the iris section of the contact lens, such that some elements that make up the outer starburst are outside of all of the elements that make up the outermost starburst pattern, and/or the elements that make up the outer starburst pattern extend closer to the pupil section such that some of those elements are inside all of the elements of the inner starburst pattern.

In yet another alternative embodiment, the inner starburst pattern creates an interdigitation configuration with either the outermost starburst pattern or the outer starburst pattern or both patterns. Further, the outermost starburst pattern may create an interdigitation configuration with the outer starburst pattern. In an interdigitation configuration, one pattern intersects another similar to the fingers on one hand placed between the fingers on the other hand in a planar fashion.

Figure 6:
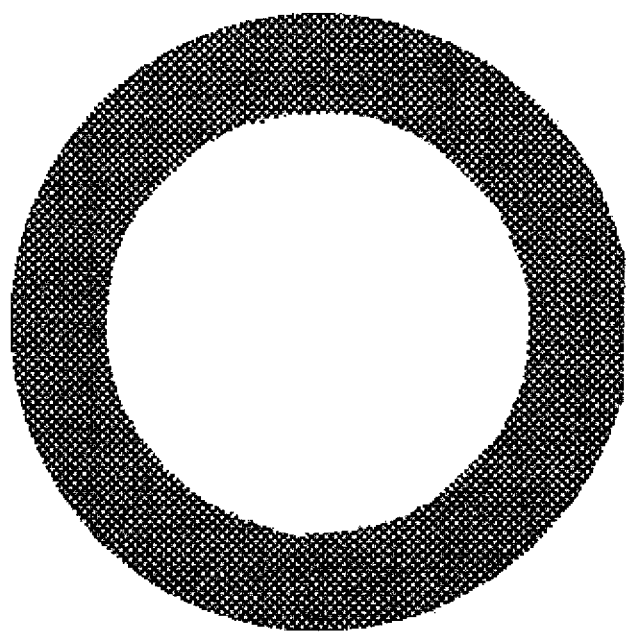
Figure 7:
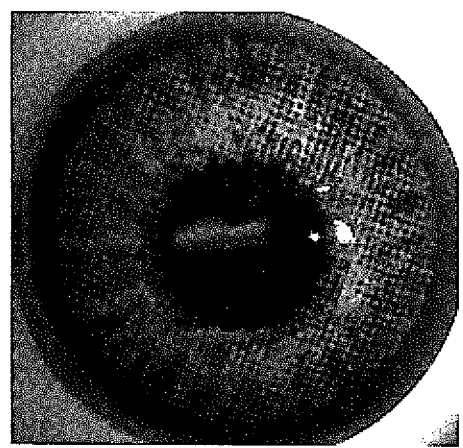
FIG. 7 illustrates an AO Colors Amethyst lens superimposed on top of a photochromic lens shortly after UV exposure

FIG. 6 as an example schematically illustrates a "limbal ring with evenly spaced circular voids". The limbal ring consists of printed area with evenly spaced circular voids and is concentric with the center of a lens and has a substantially even exterior peripheral edge and a substantially even interior peripheral edge. The exterior peripheral edge can have a diameter of from about 12.5 mm to about 14 mm. The width of the limbal ring is about 0.5 mm to about 2.5 mm; preferable from 1.0 mm to 2.0 mm. Typically, the diameter of the circular voids is about 0.0 mm to about 0.5 mm, preferably from about 0.1 mm to about 0.4 mm, more preferably from 0.2 mm to 0.3 mm. Accordance with the present invention, the limbal ring could consist of printed area with a solid (no voids) color and is concentric with the center of a lens and has a substantially even exterior peripheral edge and a substantially even interior peripheral edge An ink typically comprises at least one colorant, a binder polymer, and a solvent. An ink can optionally include a crosslinker, a humectant, a surfactant, a monomer, a polymerization initiator, an antimicrobial agent, an antioxidant agent, an anti-kogating agent, and other additives known in the art.

A colorant comprises at least one dye or preferably one pigment. Conventional and/or pearlescent pigments can be used in the invention.

A solvent can be water (water-based inks) or any appropriate organic solvent (organic solvent-based inks). Any known suitable solvents can be used, so long as they can dissolve the binder in the ink of the invention and aid in the stability of the colorant. Examples of preferred solvents include water, water mixed with one or more co-solvent, alcohols, glycols, ketones, esters, methyl ethyl ketone, cyclopentanone, and cyclohexanone.

"A binder polymer" refers to a crosslinkable polymer that comprises crosslinkable groups and can be crosslinked by a crosslinker or upon initiation by a chemical or physical means (e.g., moisture, heating, UV irradiation or the like) to trap or bind colorants onto or into a contact lens such that term is known in the art.

The term crosslinkable groups is employed herein in a broad sense and is intended to encompass, for example, functional groups and photo crosslinkable or thermally crosslinkable groups, which are well-known to a person skilled in the art. It is well known in the art that a pair of matching crosslinkable groups can form a covalent bond or linkage under known reaction conditions, such as, oxidation-reduction conditions, dehydration condensation conditions, addition conditions, substitution (or displacement) conditions, free radical polymerization conditions, 2+2 cycloaddition conditions, Diels-Alder reaction conditions, ROMP (Ring Opening Metathesis Polymerization) conditions, vulcanization conditions, cationic crosslinking conditions, and epoxy hardening conditions. For example, an amino group is covalently bondable with aldehyde (Schiff base which is formed from aldehyde group and amino group may further be reduced); an hydroxyl group and an amino group are covalently bondable with carboxyl group; carboxyl group and a sulfo group are covalently bondable with hydroxyl group; a mercapto group is covalently bondable with amino group; or a carbon-carbon double bond is covalently bondable with another carbon-carbon double bond.

Exemplary covalent bonds or linkage, which are formed between pairs of crosslinkable groups, include without limitation, alkane (carbon-carbon single bond), alkene (carbon-carbon double bond), ester, ether, acetal, ketal, vinyl ether, carbamate, urea, amine, amide, enamine, imine, oxime, amidine, iminoester, carbonate, orthoester, phosphonate, phosphinate, sulfonate, sulfinate, sulfide, sulfate, disulfide, sulfinamide, sulfonamide, thioester, aryl, silane, siloxane, heterocycles, thiocarbonate, thiocarbamate, and phosphonamide.

Exemplary crosslinkable groups include, without limitation, hydroxyl group, amine group, amide group, sulfhydryl group, —COOR (R and R' are hydrogen or $C_1$ to $C_8$ alkyl groups), halide (chloride, bromide, iodide), acyl chloride, isothiocyanate, isocyanate, monochlorotriazine, dichlorotriazine, mono- or di-halogen substituted pyridine, mono- or di-halogen substituted diazine, phosphoramidite, maleimide, aziridine, sulfonyl halide, hydroxysuccinimide ester, hydroxysulfosuccinimide ester, imido ester, hydrazine, axidonitrophenyl group, azide, 3-(2-pyridyl dithio)proprionamide, glyoxal, aldehyde, epoxy, olefinically unsaturated radicals.

A binder polymer in the ink can be any polymer which is compatible with lens material. A binder polymer can be prepared by polymerization of monomers containing vinyl alcohol, vinyl butyral, vinyl acetate, acrylic acid, methacrylic acid, hydroxy $C_1$ to $C_6$ alkyl ester of acrylic acid and methacrylic acid, amino $C_1$ to $C_8$ alkyl ester of acrylic and methacrylic acid, glycerol esters of acrylic and methacrylic acid, vinylpyrrolidone, vinylchloride, hydroxyethyl methacrylate, dimethylacrylamide, and the like. Mixtures of these different monomers could be made to form various copolymers. Other polymers could include various cellulosic resins, polyesters, polyurethanes, polyureas, or polyamides that have at least one crosslinkable group. Preferably, monomers used in preparing a binding polymer is the same as that for monomers used in making a lens.

An ink for printing a colored lens of the invention can be prepared according any known suitable methods. For example, first a solution of binding polymer and solvent is prepared and this solution is mixed with paste containing the colorant to form an ink. It is currently preferred to form inks from binding polymer solutions having a viscosity of about 40,000 cps.

Pad transfer printing is well known in the art (see. For example, U.S. Pat. No. 3,536,386 to Spivack; U.S. Pat. Nos. 4,582,402 and 4,704,017 to Knapp; U.S. Pat. No. 5,034,166 to Rawlings et al., herein incorporated by reference in their entireties). A typical example of this printing follows. An image is etched into metal to form a cliché. The cliché is placed in a printer. Once in the printer, the cliché is inked by either an open inkwell doctoring system or by a closed ink cup sliding across the image. Then, a silicone pad picks up the inked image from the cliché and transfers the image to the contact lens. The silicone pads are made of a material comprising silicone that can vary in elasticity. The properties of the silicone material permit the inks to stick to the pad temporarily and fully release from the pad when it contacts a contact lens or a mold. Appropriate pad-transfer printing structures include, but are not limited to, Tampo-type printing structures (Tampo vario 90/130), rubber stamps, thimbles, doctor's blade, direct printing, or transfer printing as they are known in the art.

Any known suitable silicone pad can be used in the present invention. Silicone pads are commercially available. However, different pads could give different print qualities. A person skilled in the art will know how to select a pad for a given ink.

Clichés can be made of ceramics or metals (e.g., steel). Where a cliché is made of a steel, it would be desirable to neutralize the pH of a water-based ink (e.g., adjusted pH to 6.8~7.8) by adding a buffer (such as, for example, phosphate salts). Images can be etched into a cliché according to any methods known to a person skilled in the art, for example, by chemical etching or laser ablation or the like. It is also desirable to clean clichés after use using standard cleaning techniques known to a person skilled in the art, such as, for example, immersion in a solvent, sonication, or mechanical abrasion.

It is understood that either the anterior (convex) or posterior (concave) surfaces of the lens may be printed, but printing the anterior surface is presently preferred.

Printing the lens using an inkjet printing process is described in published US Patent Application Nos. 2001/0050753, 2001/0085934, 2003/0119943, and 2003/0184710, herein incorporated by references in their entireties.

Alternatively, a colored contact lens of the invention can be made according to a print-on-mold process similar to those described in U.S. Pat. No. 5,034,166 to Rawlings et al. (herein incorporated by reference). An ink can be applied first on the molding surface of one or both mold portions by using pad transfer printing (or pad printing) or inkjet printing to form a colored coat (with a color image). A colored coat can be applied on the molding surface defining the posterior (concave) surface of a contact lens or on the molding surface defining the anterior surface of a contact lens or on both mold portions. Preferably, a colored coat (with a color image) is applied on the molding surface defining the anterior surface of a contact lens.

Optionally, a transferable coating can be applied to a molding surface of a mold before applying the ink by pad transfer printing. A transfer coating is intended to describe a coating which can be detached from a molding surface of a mold and become integral with the body of a contact lens molded in the mold. A transferable coating can be applied to a molding surface of mold by any suitable techniques, such as, for example, spraying, printing, swabbing, or dipping. A transferable coating can be prepared from a solution comprising polymerizable components and free of any colorants. For example, a transferable coating with substantially uniform thickness (less than 200 microns) can be prepared by spraying a molding surface with a solution having the composition (without colorant) of an ink to be used or a solution of prepolymer or a lens-forming material to be used. This transferable coating can optionally be dried or cured to form a transferable clear film (without any pigment but optionally with dyes including reactive dyes). One or more colored patterns can then be printed on this transferable coating or film. By applying a transferable coating before printing, one can make a colored lens in which printed colored patterns are imbedded just below a film derived from the transferable coating. Such lens may be more comfortable for wearing and have much less susceptibility to colorant leaching out of the colored lens.

After printing an ink of the invention on a molding surface of a mold, the printed ink can be cured by UV or other actinic radiation to form a colored film in accordance with the invention. It is desirable that the printed ink is cured actinically to an extent to minimize loss of pattern definition of the colored coat resulted from subsequent filling of a lens-forming material.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

Any lens-forming materials can be used in the invention and is not presently considered a critical part of this aspect of the invention. Lens forming materials that are suitable in the fabrication of contact lenses are illustrated by numerous issued US patents and familiar to those skilled in the art. Preferred lens-forming materials are capable of forming hydrogels. A lens-forming material can comprise one or more prepolymers, optionally one or more vinylic monomers and/or macromers and optionally further include various components, such as photoinitiator, visibility tinting agent, fillers, and the like. It should be understood that any silicone-containing prepolymers or any silicone-free prepolymers can be used in the present invention.

A preferred group of lens-forming materials are prepolymers which are water-soluble and/or meltable as described above. It would be advantageous that a lens-forming material comprises primarily one or more prepolymers which are preferably in a substantially pure form (e.g., purified by ultrafiltration). Therefore, after crosslinking/polymerizing by actinic radiation, a contact lens may require practically no more subsequent purification, such as complicated extraction of unpolymerized constituents. Furthermore, crosslinking/polymerizing may take place solvent-free or in aqueous solution, so that a subsequent solvent exchange or the hydration step is not necessary.

A person skilled in the art will know well how to actinically or thermally cure the lens-forming material within the lens-forming cavity to form the contact lens.

In a preferred embodiment, where a lens-forming material is a solution, solvent-free liquid, or melt of one or more prepolymers optionally in presence of other components, reusable molds are used and the lens-forming material is cured actinically under a spatial limitation of actinic radiation to form a colored contact lens. Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

In this case, the lens-forming material is put into a mold consisting of two mold halves, the two mold halves not touching each other but having a thin gap of annular design arranged between them. The gap is connected to the mold cavity, so that excess lens material can flow away into the gap. Instead of polypropylene molds that can be used only once, it is possible for reusable quartz, glass, sapphire molds to be used, since, following the production of a lens, these molds can be cleaned and dried rapidly to effectively remove the uncrosslinked prepolymer and other residues, using water or a suitable solvent. Reusable molds can also be made of Topas® COC grade 8007-S10 (clear amorphous copolymer of ethylene and norbornene) from Ticona GmbH of Frankfurt, Germany and Summit, New Jersey. Since the mold halves do not touch each other in the region of the lens to be produced, i.e. the cavity or actual mold faces, damage as a result of contact is ruled out. This ensures a high service life of the molds, which, in particular, also ensures high reproducibility of the contact lenses to be produced.

The two opposite surfaces (anterior surface and posterior surface) of a contact lens are defined by the two molding surfaces while the edge is defined by the spatial limitation of actinic irradiation rather than by means of mold walls. Typically, only the lens-forming material within a region bound by the two molding surfaces and the projection of the well defined peripheral boundary of the spatial limitation is crosslinked whereas any lens-forming material outside of and immediately around the peripheral boundary of the spatial limitation is not crosslinked, and thereby the edge of the contact lens should be smooth and precise duplication of the dimension and geometry of the spatial limitation of actinic radiation. Such method of making contact lenses are described in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

A spatial limitation of actinic radiation (or the spatial restriction of energy impingement) can be effected by masking for a mold that is at least partially impermeable to the particular form of energy used, as illustrated in U.S. patent application Ser. No. 08/274,942 filed Jul. 14, 1994 and U.S. Pat. No. 6,627,124 (herein incorporated by reference in their entireties) or by a mold that is highly permeable, at least at one side, to the energy form causing the crosslinking and that has mold parts being impermeable or of poor permeability to the energy, as illustrated in U.S. patent application Ser. No. 10/732,566 filed Dec. 10, 2003, Ser. No. 10/721,913 filed Nov. 25, 2003 and U.S. Pat. No. 6,627,124 (herein incorporated by reference in their entireties). The energy used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

It should be understood that an ink of the invention should have a good transferability of the colored coat from a mold to a contact lens and a good adhesion to the molded lens. The resultant colored contact lens is essentially smooth and continuous on the surface containing the color film.

The good transferability and adhesion may be resulted largely from interpenetrating network formation during curing of the lens-forming material in the mold. Without limiting this invention to any particular mechanism or theory, it is believed that the ink binders of the invention can form interpenetrating networks (IPN's) with the lens material of a hydrogel lens. Adhesion of an ink of the invention to the lens by IPN formation does not require the presence of reactive functional groups in the lens polymer. The lens-forming material is crosslinked in the presence of crosslinked binder polymer in the colored film to form IPNs. It is understood that some (residual) ethylenically unsaturated groups in the binder polymer may not be consumed during curing of the colored coat to form the colored film. These residual ethylenically unsaturated groups may undergo crosslinking reaction to bind the binder polymer to the lens material during the curing of the lens-forming material in the mold.

It is also understood that adhesion between lenses and ink could be enhanced by direct linkage (bond formation) between binder polymer and lens polymer. For example, a binder polymer containing nucleophilic groups could undergo reactions with lens polymer that contains electrophilic groups such as epoxy, anhydride, alkyl halide and isocyanate. Alternatively one could bind ink to lenses by having electrophilic groups in the ink binder polymer and nucleophic groups in the lens polymer. Curable inks could also be made by incorporating both nucleophilic and electrophilic functionality into to binder polymer.

The invention encompasses a method for making a colored color blindness contact lens, comprising the steps of:
(a) providing a mold including a first mold half having a first molding surface defining the anterior surface of a contact lens and a second mold half having a second molding surface defining the posterior surface of the contact lens, wherein the first and second mold halves are configured to receive each other such that a contact lens forming cavity is formed between the first and second molding surfaces;
(b) applying a clear ink layer onto at least one of molding surfaces of a lens mold to cover at least a iris portion of the mold surface,
(c) at least partially curing the clear ink layer with a UV/visible light,
(d) applying, by using pad-transfer or inkjet printing technique, at least one ink layer with cosmetic pattern selected from a group consisting of outermost starburst pattern, outer starburst and inner starburst pattern onto at least the one of mold surface, each of said portions overlapping each other at a plurality of points,
(e) applying, by using pad-transfer or inkjet printing technique, an annular colored pattern onto at least the one of mold surface, wherein the annular pattern is composed of colored dots which are opaque, wherein sizes of the dots and/or amounts of space between the dots of the annular colored pattern are varied in a radially-controlled manner so that local colored dot coverage increases in a radial direction from the inner perimeter of the annular iris section to the outer perimeter of the annular iris section f) at least partially curing the colored pattern ink layers with a UV/visible light g) applying, by using pad-transfer or inkjet printing technique, a second clear ink layer onto at least the one of molding surfaces after step of (g) to cover at least a central portion of the least of the one of mold surface, (h) partially or completely curing the ink layers printed on the mold to convert the ink layer coatings to a film;

(j) dispensing a lens-forming material containing photochromate into the lens-forming cavity; and (k) curing the lens-forming material within the lens-forming cavity to form a colored contact lens, whereby the film detaches from the molding surface and becomes integral with the body of the contact lens, wherein the film becomes part of one of the anterior and posterior surface of the colored cosmetic photochromic contact lens.

Any known suitable lenses made of any lens-forming material can be used to practice this invention. Preferably, hydrogel lenses or silicone-containing hydrogel lenses are used to practice this invention. Examples of preferred lenses below. Very briefly, a lens constructed of polymer having —COOH, —OH, or —NH$_2$ groups is printed with ink containing binding polymer having the same functional groups, opaque coloring substance, and a diisocyanate compound. First a solution of binding polymer and solvent is prepared and this solution is mixed with paste containing the coloring substance to form an ink. A preferred binding polymer solutions have a viscosity of about 35,000 CPS for blue, gray, brown and black, and 50,000 CPS for green. The opaque ink is printed and cured on the lens surface. The clear ink is prepared with the same binder solution but is not included any colorant or pigment.

Ink pastes and pigments that can be utilized in the present invention can be made in a number of different ways using the ingredients and percentages (by weight) as described below in the table 1. For example, a hazel ink paste can be made using 63.49 percent binder solution (by weight), 30.00 percent ethyl lactate, 0.61 percent titanium dioxide, 0.06 percent PCN blue, 4.30 percent iron oxide yellow, and 1.54 percent iron oxide red. Although these colors are used for the preferred embodiments, other colors or variations of the weight percentage of ingredients may be used. The table below provides merely representative examples of the possible inks and pigment levels, and is not a complete list. One of ordinary skill in the art could develop other inks and pigment levels that would provide an enhancing effect to the iris of a person wearing the contact lens.

TABLE 1

| Lens Formulation (unit weight parts) | | | | | | | | | | | |
|---|---|---|---|---|---|---|---|---|---|---|---|
| | Ethyl Lactate | Binder soln | PCN Blue | PCN green | TiO$_2$ | Iron Oxide black | Iron Oxide Red | Iron Oxide Brown | Iron Oxide Yellow | Cr$_2$O$_3$ | Carbazole Violet | Hydrophobic Iron Oxide |
| Blue | 30.55 | 61.15 | 1.21 | | 7.09 | | | | | | | |
| Gray | 30.75 | 59.84 | | 0.23 | 7.34 | 1.83 | | | | | | |
| Brown | 30.00 | 55.10 | | | | | 5.70 | 3.45 | 5.75 | | | |
| Hazel | 30.00 | 63.49 | 0.06 | | 0.61 | | 1.54 | | 4.30 | | | |
| Green | 28.53 | 63.85 | 0.03 | | | | | | | 7.59 | | |
| Black | 23.98 | 64.04 | | | | 11.98 | | | | | | |
| Turquoise | 30.00 | 58.16 | 0.63 | 2.25 | 8.88 | | | | | | 0.08 | |
| Orange | 30.00 | 58.00 | | | | | 6.00 | | | | | 6.00 | include: without limitation, lenses described in Loshaek's U.S. Pat. No. 4,668,240 (incorporated herein by reference in its entirety); lenses prepared from a water-soluble crosslinkable poly(vinyl alcohol) prepolymer as described in U.S. Pat. Nos. 5,583,163 and 6,303,687 (incorporated by reference in their entireties); lenses made from a water-soluble crosslinkable polyurea prepolymer as described in U.S. Pat. No. 6,479,587 (herein incorporated by reference in its entirety) and a U.S. patent application No. 60/525,100 filed Nov. 25, 2003 entitled "Crosslinkable polyurea prepolymers" (herein incorporated by reference in its entirety); and the like. It is understood that any commercial available lenses, such as, for example, FOCUS DAILIES®, ACUVUE®, etc., can be used to practice this invention.

The previous disclosure will enable one having ordinary skill in the art to practice the invention. In order to better enable the reader to understand specific embodiments and the advantages thereof, reference to the following examples is suggested. The percentages in the formulations are based on weight percentages unless otherwise specified.

Preferred lenses and ink ingredients used to practice this invention are known and described in Loshaek's U.S. Pat. No. 4,668,240, incorporated herein by reference. The specific ingredients and target weights are described in detail below. Titanium dioxide, the only naturally occurring oxide of titanium at atmospheric pressure, exhibits three polymorphs: rutile, anatase, and brookite [1-7]. While rutile is the stable phase, both anatase and brookite are metastable;

Printing inks listed above consisting of high refractive index pigments that have increased light reflectance:

Titanium dioxide (rutile phase) RI~2.609
Titanium dioxide (anatase phase) RI~2.488
Titanium dioxide (brookite phase) RI~2.583
Red iron oxide (Fe2O3) RI~2.42
Yellow Iron Oxide (FeO(OH)) RI~2.40
Mica RI~1.563
Mica-based pearlescent pigments:
 formed by depositing titanium or iron salts from a basic solution onto mica, followed by calcination to produce titanium dioxide or iron oxides on mica.

A clear coat of a donut shape (center is empty) is first applied onto the molding surface of the female mold half by using a pad printing to print a round shape with the clear ink. The clear coat is cured with UV light for about 1-5 seconds prior to subsequent prints.

An outermost starburst colored pattern is printed onto the cured clear coat on the molding surface of the female mold half; and an inner starburst colored pattern is printed onto the cured clear coat on the molding surface of the female mold half; an annular colored pattern is printed onto the cured clear coat on the molding surface of the female mold half using a pad printing.

A lens-forming material containing Photochromate(s) is dispensed in a female mold half with the clear layer and colored patterns and curing the lens-forming material within the lens-forming cavity to form a colored cosmetic photochromic contact lens, whereby the film detaches from the molding surface and becomes integral with the body of the colored cosmetic photochromic contact lens, wherein the film becomes part of one of the anterior and posterior surface of the colored cosmetic photochromic contact lens and has a good adhesion to the lens.

Example 1

Chemicals

The following abbreviations are used in the following examples: NVP represents N-vinylpyrrolidone; DMA represents N,N-dimethyl acrylamide; MMA represents methyl methacrylate; TEGDMA represent triethyleneglycol dimethacrylate; EGMA represents ethylene glycol methyl ether methacrylate; AMA represents allyl methacrylate; V64 represents 2,2'-dimethyl-2,2'azodipiononitrile; V88 represents 1,1'-Azobis(cyanocyclohexane) which has a 10-hour half-life temperature of 88° C.; Nobloc is 2-[3-(2H-Benzotriazol-2-yl)-4-hydroxyphenyl]ethyl methacrylate; RB247 is Reactive Blue 247; TAA represents tert-amyl alcohol; PrOH represents 1-propanol; IPA represents isopropanol; PBS represents a phosphate-buffered saline which has a pH of 7.2±0.2 at 25° C. and contains about 0.044 wt. % $NaH_2PO_4 \cdot H_2O$, about 0.388 wt. % $Na_2HPO_4 \cdot 2H_2O$, and about 0.79 wt. % NaCl and; wt. % represents weight percent; D6 represents monobutyl-terminated monomethacryloxypropyl-terminated polydimethylsiloxane (M.W. 700 to 800 g/mol from Shin Etsu); "G1" macromer represents a di-methacryloyloxypropyl-terminated polysiloxane (Mn~7.5-8.1K g/mol, OH content~1.25-1.55 meq/g) of formula (A) shown above.

G-PDMS 1661 represents a di-methacrylate-terminated polysiloxane (MW. 9K g/mol) of the following structural formula:

Example 3

This example illustrates the adverse effects of a photochromic compound in a lens formulation upon the delensing.

Preparation of Polymerizable Compositions

Three lens formulations (polymerizable compositions), I to III, are prepared to have compositions (in weight unit parts) as shown in Table 2.

TABLE 2

| Chemical | Parts |
| --- | --- |
| TEGDMA | 0.3 |
| D6 | 31 |
| G-PDMS 1661A | 13 |
| DMA | 34 |
| MMA | 9 |
| EGMA | 10.2 |
| TAA | 5 |
| Vazo-64 | 0.5 |
| Humber blue* | 0.8 |
| Penine Green* | 1.2 |

*Photochromates from Vivimed Lab Limited.

The formulations are prepared by adding listed components into a clean bottle, with a stir bar to mix at 600 rpm for 30 min at room temperature. After all the solid is dissolved, a filtration of the formulation is carried out by using 2.7 μm GMF filter.

Cast Molding

A lens formulation is purged with nitrogen at room temperature for 30 to 35 minutes. The $N_2$-purged lens formulation is introduced into polypropylene molds and thermally cured under the following curing conditions: ramp from room temperature to 55° C. at a ramp rate of about 7° C./minute; holding at 55° C. for about 30 minutes; ramp from 55° C. to 80° C. at a ramp rate of about 7° C./minute; holding at 55° C. for about 30 minutes; ramp from 80° C. to 100° C. at a ramp rate of about 7° C./minute; and holding at 100° C. for about 30 minutes.

Mold Separation and Delensing

Lens molds each with a molded silicone hydrogel contact lens precursor therein are mechanically opened as illustrated

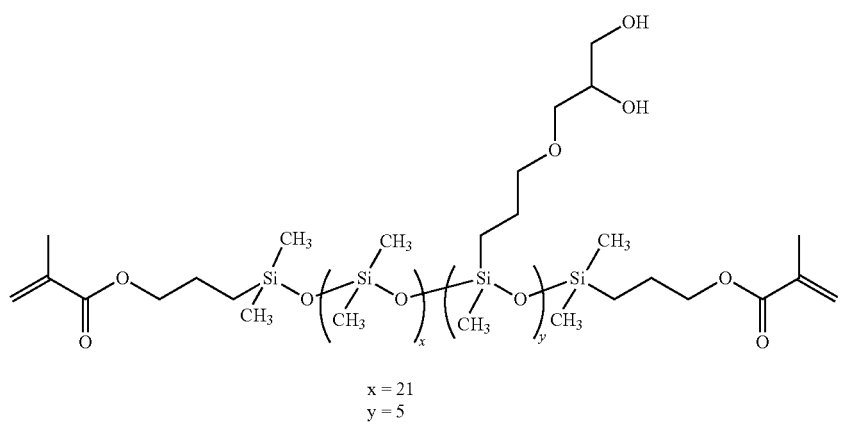

x = 21
y = 5 by FIG. 2 and described above. The molded unprocessed silicone hydrogel contact lens precursors adhere to the male mold halves and are removed mechanically from the male mold halves (i.e., dry-delensed).

Post-Molding Processes

After de-molding and delensing, silicone hydrogel contact lenses are placed in plastic trays. Then the trays with lenses are immersed in the PAA solution prepared above for about 2 hours and then immersed in PBS for about 5 minutes to one hour at room temperature for forming PAA-coated SiHy lenses. Adequate agitation (e.g. horizontal shaking or up-down movement) is used to ensure appropriate flow of PAA solution and PBS during immersion.

Then, PAA-coated SiHy lenses prepared above are placed in polypropylene lens packaging shells (one lens per shell) with 0.55 mL or 0.65 ml of the IPC saline (about half of the saline may be added prior to inserting the lens). The blisters are then sealed with foil and autoclaved for about 45 minutes at about 121° C., forming SiHy contact lenses with cross-linked coatings (PAA-x-hydrophilic polymeric material) thereon.

The main advantage the invention has over prior materials is a more natural appearance of the eye effected by the presence of a cosmetic pattern surrounding the pupil region. The potential enhancement is shown in the FIG. 7 (Note: this is an AO Colors Amethyst lens superimposed on top of a photochromic lens shortly after UV exposure).

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. A colored cosmetic photochromic contact lens, comprising: a pupil section, a generally annular iris section surrounding the pupil section, wherein at least the pupil section is photochromic, wherein the iris section having a colored, printed, opaque, intermittent pattern, wherein an ink layer of colored, printed, opaque, intermittent pattern comprising a rutile titanium dioxide pigment 8% (w/w) to 10% (w/w), based on the weight of the ink layer, wherein the said pattern is covered by a clear ink layer, wherein the clear ink layer is on outer surface of lens to the observer, wherein said pattern comprising: a) an annular pattern of a color having a first shade, wherein the annular pattern is composed of colored dots which are opaque, and the annular pattern has a substantially even outer peripheral edge and a substantially even inner peripheral edge, and the outer peripheral edge can have a diameter of from about 13.5 mm to about 12.5 mm and the inner peripheral edge can have a diameter of from about 5 mm to about 7 mm, and at least at least two other colored patterns extending across a portion of the iris section selected from a group of patterns consisting of outermost starburst pattern, outer starburst pattern and inner starburst pattern, wherein the outermost starburst pattern comprising dots of a second shade, the outer starburst pattern comprising dots of a third shade and inner starburst pattern comprising dots of a fourth shade, wherein all four shades are either the same or different from each other shade, wherein sizes of the colored dots and/or amounts of space between the colored dots of the annular colored pattern are varied in a radially-controlled manner so that local colored dot coverage increases in a radial direction from the inner perimeter of the annular iris section to the outer perimeter of the annular iris section, wherein annular colored pattern has a size sufficient to cover the most or the whole iris of an eye to make changes to the color of the eye or enhance the color of the eye, and wherein the combination of the substantially-annular colored pattern and the other color patterns to mask or reduce the abnormal appearance from the viewer by creating the appearance of blending in the dark colors with the colored, printed, opaque, intermittent pattern of iris section while the photochromic lens is in the activated state.

2. The colored cosmetic photochromic contact lens of claim 1, wherein the iris section is photochromic.

3. The colored cosmetic photochromic contact lens of claim 1, comprising the outermost starburst pattern comprising dots of the second shade and the outer starburst pattern, wherein the outer starburst pattern comprising dots of the third shade and overlaying at least a portion of the outer most starburst pattern.

4. The colored cosmetic photochromic contact lens of claim 1, comprising the outermost starburst pattern comprising dots of the second shade and the inner starburst pattern, wherein the inner starburst pattern comprising dots of the fourth shade and overlaying at least a portion of the outer most starburst pattern.

5. The colored cosmetic photochromic contact lens of claim 1, comprising the outer starburst pattern comprising dots of the third shade and the inner starburst pattern, wherein the inner starburst pattern comprising dots of the fourth shade and overlaying at least a portion of the outer starburst pattern.

6. The colored cosmetic photochromic contact lens of claim 5, comprising a) the outermost starburst pattern comprising dots of the second shade, b) the outer starburst pattern, wherein the outer starburst pattern comprising dots of the third shade and overlaying at least a portion of the outer most starburst pattern and c) the inner starburst pattern, wherein the inner starburst pattern comprising dots of the fourth shade and overlaying at least a portion of the outer starburst pattern and a portion of the outer most starburst pattern.

7. The colored cosmetic photochromic contact lens of claim 1, wherein the shade of a substantially annular pattern is at least one of hazel, yellow, yellow green, brown, yellow brown, gold, and orange to blend in with the pupil section.

8. The colored cosmetic photochromic contact lens of claim 1, further comprises a dark limbal ring located near the peripheral edge of the annular colored pattern, wherein the limbal ring is comprised of a dark colorant and has a substantially even exterior peripheral edge and a jagged or substantially-even interior peripheral edge.

9. The colored cosmetic photochromic contact lens of claim 8, wherein the limbal ring overlaps to some degrees with the annular color pattern.

10. The colored cosmetic photochromic contact lens of claim 1, wherein both the sizes of the dots and the amounts of space between two dots are varied in a way that the size of each dot increases gradually whereas the amount of space between dots decreases gradually in the radial direction.

11. The colored cosmetic photochromic contact lens of claim 1, wherein the size of each dot is substantially constant whereas the amount of space between dots decreases gradually in the radial direction.

* * * * *